United States Patent
Li et al.

(10) Patent No.: US 9,172,414 B2
(45) Date of Patent: Oct. 27, 2015

(54) METHOD AND DEVICE FOR IMPLEMENTING RADIO FREQUENCY COEXISTENCE MANAGEMENT STRATEGY IN WIRELESS DEVICES

(71) Applicant: QUALCOMM Incorporated, San Diego, CA (US)

(72) Inventors: Wenjun Li, San Diego, CA (US); Huang Lou, San Diego, CA (US); Michael L. McCloud, San Diego, CA (US); Amit Mahajan, San Diego, CA (US); Nate Chizgi, San Diego, CA (US); Jing Sun, San Diego, CA (US); Francis M. Ngai, Louisville, CO (US); Jun Hu, San Diego, CA (US); Vansh Pal Singh Makh, Santa Clara, CA (US); Prashanth Akula, San Diego, CA (US); Tsai-Chen Huang, San Diego, CA (US); Jittra Jootar, La Jolla, CA (US); Erdogan Dede, San Diego, CA (US); Narendra Varma Gottimukkala, San Diego, CA (US); Yingbo Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/023,569

(22) Filed: Sep. 11, 2013

(65) Prior Publication Data

US 2014/0213210 A1    Jul. 31, 2014

Related U.S. Application Data

(60) Provisional application No. 61/759,373, filed on Jan. 31, 2013.

(51) Int. Cl.
*H04B 1/00* (2006.01)
*H04B 15/00* (2006.01)
(Continued)

(52) U.S. Cl.
CPC ............. *H04B 1/12* (2013.01); *H04B 1/1027* (2013.01); *H04B 1/525* (2013.01); *H04B 15/04* (2013.01); *H04W 16/14* (2013.01); *H04W 88/06* (2013.01)

(58) Field of Classification Search
USPC .............. 455/63.1, 63.3, 78, 114.2, 296, 311, 455/278.1
See application file for complete search history.

(56) References Cited

U.S. PATENT DOCUMENTS

| 5,526,398 A | 6/1996 | Okada et al. |
|---|---|---|
| 7,333,830 B2 | 2/2008 | Malone |

(Continued)

FOREIGN PATENT DOCUMENTS

WO    2013150171 A1    10/2013

OTHER PUBLICATIONS

International Search Report and Written Opinion—PCT/US2014/032048—ISA/EPO—Jul. 25, 2014.

*Primary Examiner* — Nguyen Vo
(74) *Attorney, Agent, or Firm* — The Marbury Law Group, PLLC

(57) ABSTRACT

The various embodiments include a dual-SIM-dual-active (DSDA) device and methods for implementing robust receive (Rx) processing to resolve radio frequency coexistence interference between two subscriptions operating on the DSDA device. The DSDA device may detect when a subscription (the "aggressor") de-senses the other subscription (the "victim") as a result of the aggressor's transmissions, and in response, implement robust Rx processing to mitigate the effects of de-sense on the victim while causing minimal impact to the aggressor.

40 Claims, 12 Drawing Sheets

(51) Int. Cl.
*H04B 1/10* (2006.01)
*H04B 1/12* (2006.01)
*H04B 1/525* (2015.01)
*H04W 16/14* (2009.01)
*H04B 15/04* (2006.01)
*H04W 88/06* (2009.01)

(56) References Cited

U.S. PATENT DOCUMENTS

| | | | |
|---|---|---|---|
| 8,204,036 B2 | 6/2012 | Russell et al. | |
| 8,265,563 B2 | 9/2012 | Beninghaus et al. | |
| 8,265,691 B2 | 9/2012 | Mauney et al. | |
| 8,295,782 B2 | 10/2012 | Rofougaran | |
| 8,340,578 B2 | 12/2012 | Tolentino et al. | |
| 2007/0064835 A1* | 3/2007 | Auranen | 375/316 |
| 2009/0086864 A1 | 4/2009 | Komninakis et al. | |
| 2009/0253450 A1* | 10/2009 | Gupta | 455/509 |
| 2009/0262785 A1* | 10/2009 | Wilhelmsson | 375/133 |
| 2010/0197235 A1 | 8/2010 | Wilhelmsson | |
| 2010/0227570 A1 | 9/2010 | Hendin | |
| 2011/0009136 A1* | 1/2011 | Mantravadi et al. | 455/501 |
| 2011/0097998 A1* | 4/2011 | Ko et al. | 455/41.2 |
| 2011/0300914 A1* | 12/2011 | Gudem et al. | 455/574 |
| 2012/0178386 A1 | 7/2012 | Pascolini et al. | |
| 2012/0207040 A1* | 8/2012 | Comsa et al. | 370/252 |
| 2012/0231836 A1 | 9/2012 | Kuo et al. | |
| 2013/0012135 A1* | 1/2013 | Ruohonen et al. | 455/63.1 |
| 2014/0213235 A1 | 7/2014 | Lou et al. | |

* cited by examiner

METHOD AND DEVICE FOR IMPLEMENTING RADIO FREQUENCY COEXISTENCE MANAGEMENT STRATEGY IN WIRELESS DEVICES

RELATED APPLICATIONS

This application claims the benefit of priority to U.S. Provisional Application No. 61/759,373 entitled "Method of Robust Rx/Tx Processing for RF Coexistence Management in Dual-SIM-Dual-Active" filed Jan. 31, 2013, the entire contents of which are hereby incorporated by reference.

BACKGROUND

Some new designs of mobile communication devices-such as smart phones, tablet computers, and laptop computers-support two Subscriber Identity Module (SIM) cards that provide users with access to two separate mobile telephony networks. Examples of mobile telephony networks include GSM, TDSCDMA, CDMA2000, and WCDMA. Example multi-SIM mobile communication devices include mobile phones, laptop computers, smart phones, and other mobile communication devices that are enable to connect to multiple mobile telephony networks. A mobile communication device that includes two SIM cards and connects to two separate mobile telephony networks using two separate radio frequency (RF) communication circuits is termed a "dual-SIM-dual-active" (DSDA) device.

Because a DSDA device has two separate RF communication circuits or "RF chains," each subscription on the DSDA device may use its associated RF chain to communicate with its mobile network at any time. However, because of the proximity of the antennas of the two RF chains included in a DSDA communication device, the simultaneous use of the two RF chains may cause one RF chain to desensitize and thus interfere with the ability of the other RF chain to receive transmission.

Receiver desensitization ("de-sense"), or degradation of receiver sensitivity, may result from noise interference from a nearby transmitter. In particular, when two radios are close together with one transmitting on the uplink and the other receiving on the downlink, the feedback from the transmitter may be picked by the receiver. As a result, the received signals may become corrupted and difficult or impossible to decode. Further, feedback from the transmitter can be detected by a power monitor that measures the receive signal, which would cause the mobile device to falsely determine the presence of a cell site. In particular, receiver de-sense may present a challenge in multi-radio devices, such as devices configured with multiple SIMs, due to the necessary proximity of transmitter and receiver.

In general, mobile device radio receivers may have filters to reduce interference from a simultaneous transmit signal. In order to be effective, a transmit filter needs to be positioned in the radio circuitry after the signal is amplified, but that requires a filter that can handle high power levels, and such filters are expensive. As such, previous communication system designs are inadequate to mitigate the effects of de-sense in DSDA devices. Thus, there is a need for a method for managing the de-sense received on one of the RF chains in a DSDA device.

SUMMARY

The various embodiments include a dual-SIM-dual-active device (i.e., a DSDA device) and methods for implementing robust Rx processing to resolve RF coexistence interference between two subscriptions operating on the DSDA device. In the various embodiments, one subscription (the "aggressor") may de-sense the other subscription (the "victim") as a result of the aggressor's transmissions, thereby negatively impacting the ability of the victim to perform reception. The DSDA device may detect this de-sensing and implement robust Rx processing to mitigate the effects of de-sense on the victim while causing minimal impact to the aggressor, thereby dramatically improving the victim's overall performance.

In an embodiment, the DSDA device may determine whether the aggressor is de-sensing the victim. The DSDA device may monitor various potential sources of interference and measure the total interference power affecting the victim. In a further embodiment, the DSDA device may determine whether the total interference power is above a certain de-sense threshold before performing further operations.

In another embodiment, the DSDA device may create an RF coexistence management strategy based on, for example, the radio access technologies of the aggressor and victim. In an embodiment, the RF coexistence management strategy may include changes to the aggressor's and/or victim's operations during robust Rx processing based on various circumstance, such as whether the de-sense affecting the victim is persistent.

In an embodiment, the DSDA device may determine whether to implement robust Rx processing. For example, the DSDA device may determine whether implementing robust Rx processing is necessary given the level of de-sense experienced by the victim and/or the relative priorities of the victim and aggressor. The DSDA device's assessment may be based on the extent to which the victim's Rx power would be affected by robust Rx processing and/or the relative priorities of the victim and aggressor.

In further embodiments, the DSDA device may implement robust Rx processing on the victim. In an embodiment, the DSDA device may implement a sample nulling strategy during the aggressor's transmission times. In another embodiment, the DSDA device may freeze various loops and/or filters of the victim, as well as the victim's power control during the aggressor's transmission times, and may schedule searcher activities/measurements around the aggressor's transmission times. The DSDA may continue to implement robust Rx processing for a determined duration and may configure the victim and aggressor to operate normally when the DSDA device is not implementing robust Rx processing.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
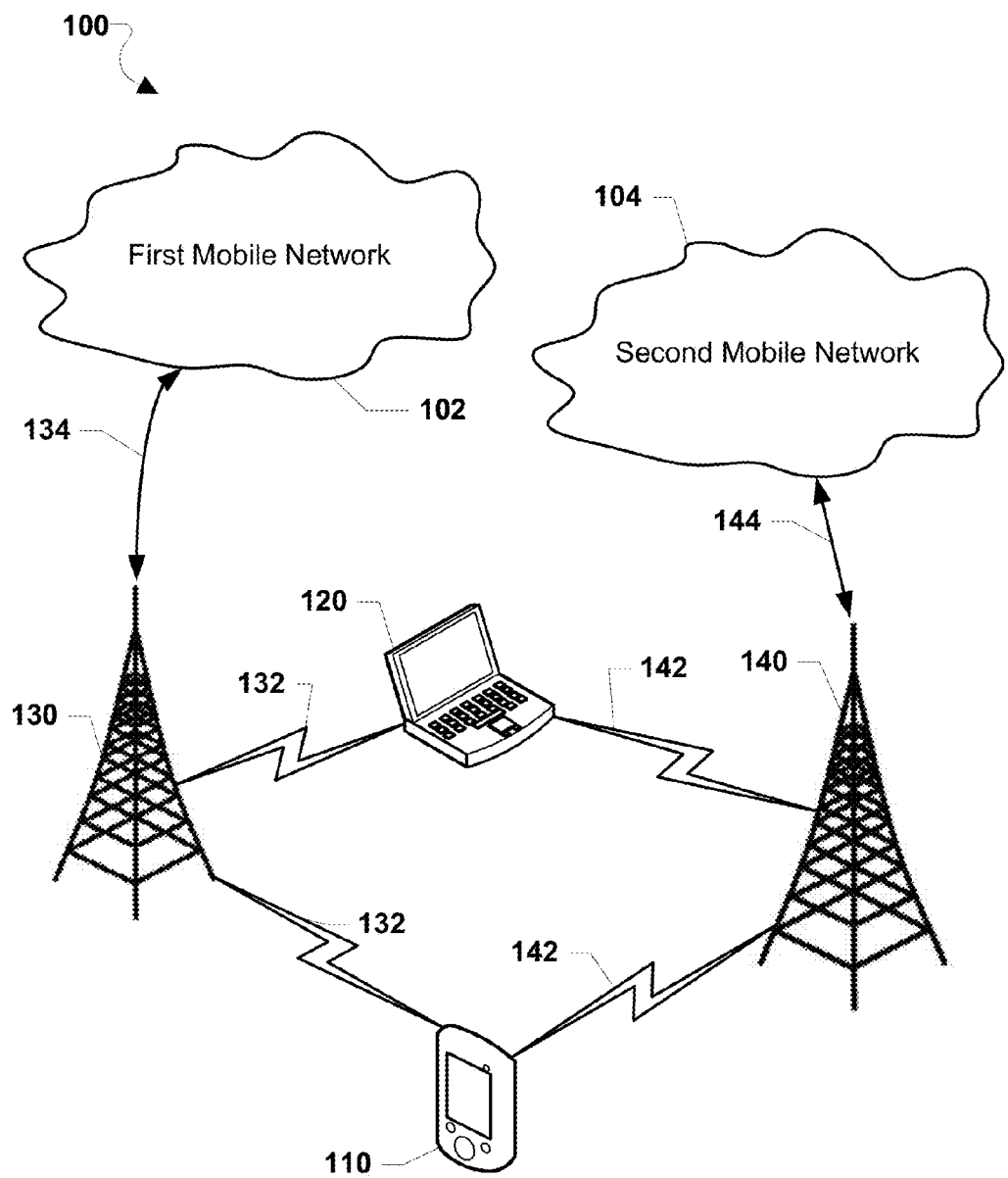
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "DSDA device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for connecting to at least two mobile communication networks. The various aspects may be useful in mobile communication devices, such as smart phones, and so such devices are referred to in the descriptions of the various embodiments. However, the embodiments may be useful in any electronic devices that may individually maintain a plurality of subscriptions to a plurality of mobile networks through multiple radio communication circuits.

DSDA devices include two SIM cards that enable a user to connect to two different mobile networks (or different accounts on the same network) while using the same DSDA device. Each SIM card serves to identify and authenticate a subscriber using a particular DSDA device, and each SIM card is associated with only one subscription. For example, a SIM card may be associated with a subscription to one of GSM, TDSCDMA, CDMA2000, and WCDMA. In the various embodiments, DSDA devices may also include a plurality of RF resources (e.g., two RF chains) so that each network communications supported by both SIMs can be accomplished simultaneously if interference problems are managed.

DSDA devices can suffer from interference between two communications being accomplished simultaneously, such as when one communication session is transmitting ("Tx") at the same time as another RF chain is attempting to receive ("Rx"). As used herein, the term "RF interference event" refers to an occasion in which one subscription in a DSDA device is attempting to transmit while the other subscription in the DSDA is attempt to receive transmission simultaneously. As used herein, the term "victim" refers to the subscription attempting to receive during a RF interference event. Additionally, the term "aggressor" refers to the subscription in the DSDA device attempting to transmit. In various embodiments, an aggressor's transmissions may de-sense the victim's reception. In other words, the victim may receive the aggressor's transmissions, which act as noise and may interfere with the victim's ability to receive wanted signals.

In DSDA devices, an aggressor's transmissions may cause severe impairment to the victim's ability to receive transmission. This interference may be in the form of blocking interference, harmonics, intermodulation, and other noises and distortion. Such interference may significantly degrade the victim's receiver sensitivity, voice call quality, and data throughput. The interference may also cause higher rates for call drops and radio link failures and may cause the victim to lose a data connection. These effects may also result in a reduced network capacity.

The various embodiments address this interference problem by providing methods for implementing robust Rx processing, which mitigates the effects of de-sense on the victim and allows simultaneous calls on dual-SIMS without new hardware. In the various embodiments, robust Rx processing may cause minimal impact to the aggressor, which is desirable when the aggressor's call has priority. Robust Rx processing may also dramatically improve the victim's performance in terms of receiver sensitivity, call setup success rate, retention rate, voice quality and data throughput, and the victim's network capacity may also be improved.

The various embodiments may be implemented within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first DSDA device 110 may be in communication with the first mobile network 102 through a cellular connection 132 to a first base station 130. The first DSDA device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second DSDA device 120 may similarly communicate with the first mobile network 102 through a cellular connection 132 to a first base station 130. The second DSDA device 120 may communicate with the second mobile network 104 through a cellular connection 142 to the second base station 140. Cellular connections 132 and 142 may be made through two-way wireless communication links, such as 4G, 3G, CDMA, TDMA, WCDMA, GSM, and other mobile telephony communication technologies.

Figure 2:
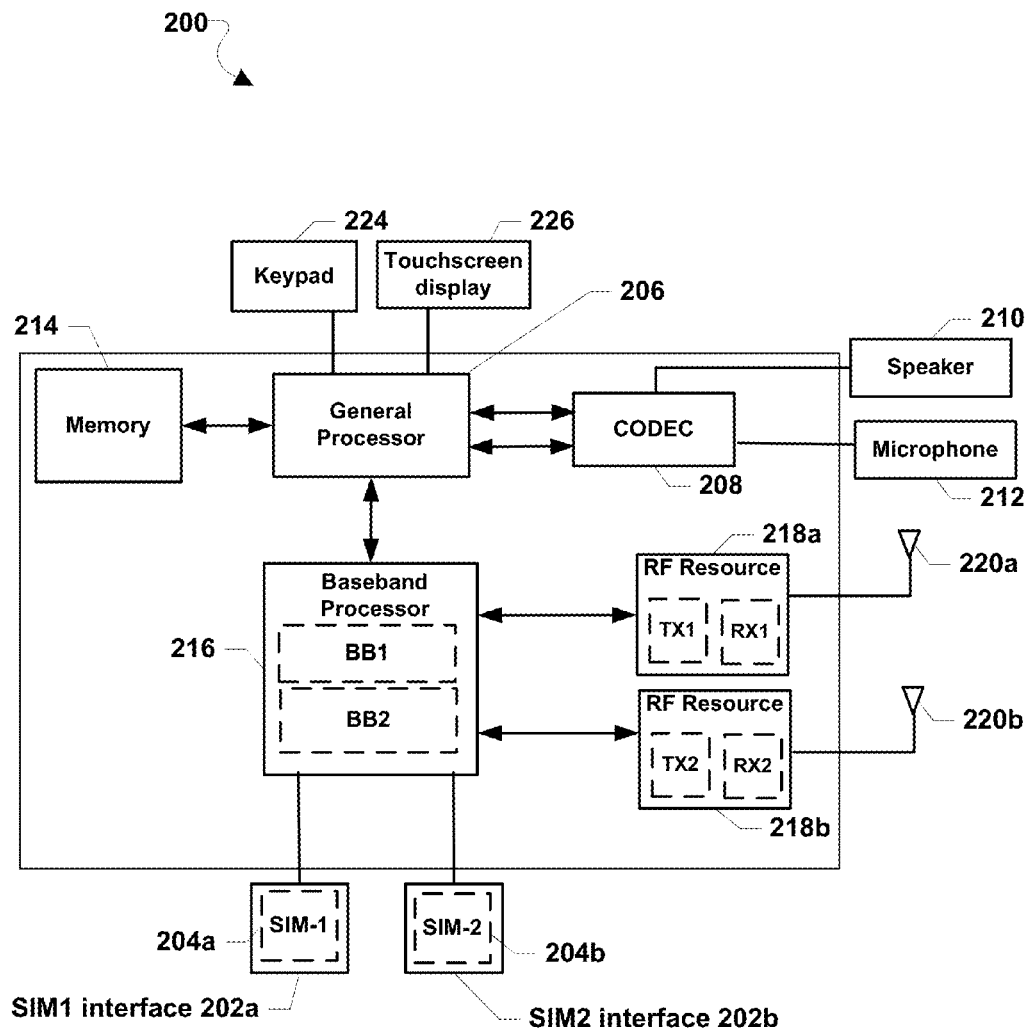
FIG. 2 is a component block diagram of an embodiment dual-SIM dual active wireless communications device.

FIG. 2 is a functional block diagram of a DSDA device 200 that is suitable for implementing the various embodiments. The DSDA device 200 may include a first SIM interface 202a, which may receive a first identity module SIM-1 204a that is associated with the first subscription. The DSDA device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM card may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM card may further store a Home Public-Land-Mobile-Network (HPLMN) code to indicate the SIM card network operator provider. An Integrated Circuit Card Identity (IC-CID) SIM serial number is printed on the SIM card for identification.

Each DSDA device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain.

The memory 214 may store operating system (OS), as well as user application software and executable instructions. The memory 214 may also store application data, such as an array data structure.

The general processor 206 and memory 214 may each be coupled to at least one baseband modem processor 216. Each SIM in the DSDA device 200 (e.g., SIM-1 202a and SIM-2 202b) may be associated with a baseband-RF resource chain. Each baseband-RF resource chain may include baseband modem processor 216 to perform baseband/modem functions for communications on a SIM, and one or more amplifiers and radios, referred to generally herein as RF resources 218. In one embodiment, baseband-RF resource chains may share a common baseband modem processor 216 (i.e., a single device that performs baseband/modem functions for all SIMs on the wireless device). Alternatively, each baseband-RF resource chain may include physically or logically separate baseband processors (e.g., BB1, BB2).

RF resources 218a, 218b may each be communication circuits or transceivers that perform transmit/receive functions for the associated SIM of the wireless device. RF resources 218a, 218b may be communication circuits that include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In a particular embodiment, the general processor 206, memory 214, baseband processor(s) 216, and RF resources 218a, 218b may be included in the DSDA device 200 as a system-on-chip. In another embodiment, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the DSDA device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in DSDA device 200 to enable communication between them, as is known in the art.

Figure 3:
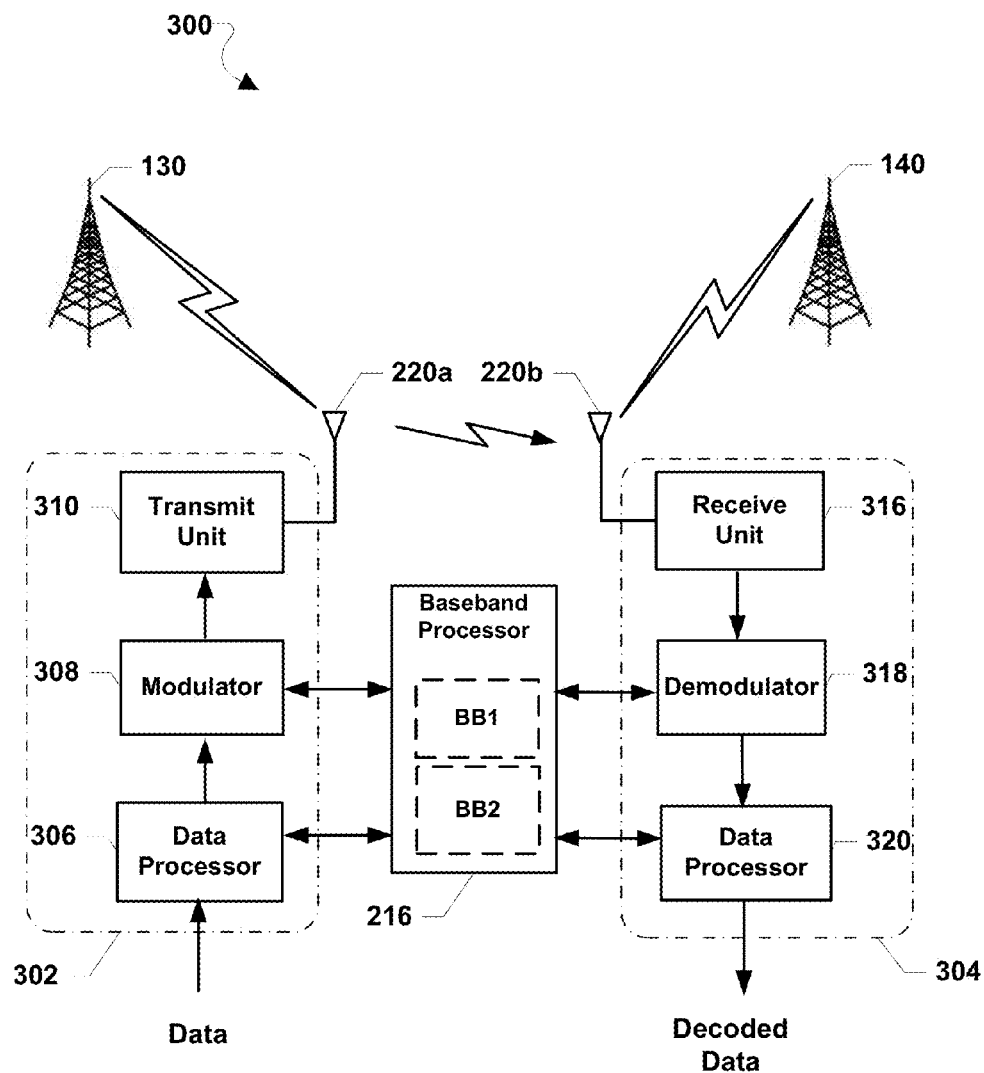
FIG. 3 is a component block diagram illustrating the interaction between components of different transmit/receive chains in an embodiment dual-SIM dual active wireless communications device.

FIG. 3 illustrates a block diagram 300 of transmit and receive components in separate RF resources. For example, a transmitter 302 may be part of one RF resource 218a, and a receiver 304 may be part of another RF resource 218b, as described above with reference to FIG. 2. In a particular embodiment, the transmitter 302 may include a data processor 306 that may format, encode, and interleave data to be transmitted. The transmitter 302 may include a modulator 308 that modulates a carrier signal with encoded data, for example, by performing Gaussian minimum shift keying (GMSK). One or more transmit circuits 310 may condition the modulated signal (e.g., by filtering, amplifying, and upconverting) to generate a RF modulated signal for transmission. The RF modulated signal may be transmitted, for example, to a base station 130 via an antenna, such as antenna 220a as shown in FIG. 2.

At the receiver 304, an antenna 220b may receive RF modulated signals from a base station 140 for example. However, the antenna 220b may also receive some RF signaling from the transmitter 302, which ultimately competes with the desired signal from the base station 140. One or more receive circuits 316 may condition (e.g., filter, amplify, and down-convert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the wireless device. Operations of the transmitter and the receiver may be controlled by a processor, such as a baseband processor(s) 216 as illustrated in FIG. 2. In the various embodiments, each of the transmitter 302 and receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry (i.e., as transceivers associated with SIM-1 and SIM-2).

As discussed above, receiver de-sense may occur when data associated with a first SIM transmitted on the uplink interferes with receive activity on a different transmit/receive chain that may be associated with a second SIM. The desired signals may become corrupted and difficult or impossible to decode. Further, noise from the transmitter may be detected by a power monitor that measures the signal strength of surrounding cells, which may cause the DSDA device to falsely determine the presence of a nearby cell site.

In an embodiment, upon detecting that receiver de-sense may occur due to interference from transmit signals associated with another SIM in a DSDA device, the DSDA device may implement an algorithm to select an optimal de-sense mitigating action, such as robust Rx processing. In an embodiment, and as further discussed in reference to FIGS. 9A-9B below, implementing robust Rx processing may include ignoring or assigning lower significance to the jammed portion of the received signal. In another embodiment, the DSDA may cancel the interfering data from the received signal, which may be more costly than ignoring the jammed portion of the received signal.

By tailoring the mitigating action to various properties of the transmitter and receiver, the DSDA device may maximize reduction in de-sense on the victim while minimizing possible degradation of service. The mitigating actions may be taken as soon as de-sense is detected without waiting for response from the network.

Figure 4:
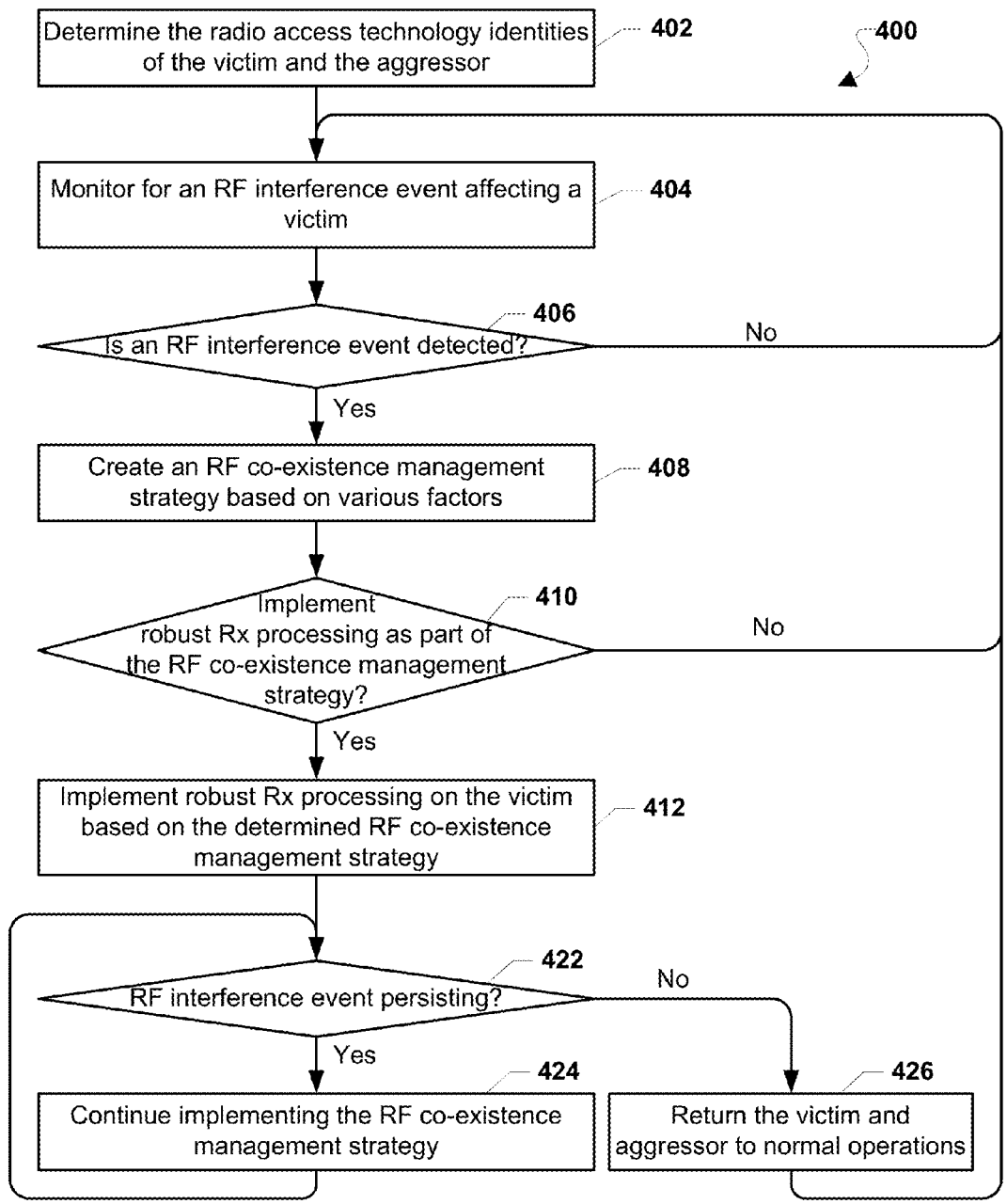
FIG. 4 is a process flow diagram illustrating an embodiment method for implementing an RF co-existence strategy on a DSDA device.

FIG. 4 illustrates an embodiment DSDA device method 400 for using robust Rx processing to mitigate the effects of de-sense on a victim. In block 402, the DSDA device may determine the radio access technology identities of the victim and the aggressor. For example, the DSDA device may determine that the victim is a subscription using a frequency-division duplexing technology ("FDD"), such as WCDMA or CDMA, and that the aggressor is a subscription using time-divisional duplexing technology ("TDD"), such as a GSM radio technology.

In block 404, the DSDA device may monitor for an RF interference event affecting the victim. In various embodiments, an RF interference event may include a situation in which the aggressor's transmitter de-senses the victim's receiver. For example, the aggressor may attempt to transmit while the victim is attempting to receive.

In determination block 406, the DSDA device may determine whether an RF interference event is detected. For example, the DSDA device may determine whether the aggressor is de-sensing the victim in excess of an acceptable threshold level of de-sense. In various embodiments, the DSDA device may also assess whether the magnitude of the victim's de-sense is sufficient to merit implementing an RF co-existence management strategy. In other words, the DSDA device may determine whether the degree of de-sense is "worth" the costs associated with implementing an RF co-existence management strategy.

If the DSDA device determines that an RF interference event is not detected (i.e., determination block 406="No"), the process may continue in a loop as the DSDA device may continue monitoring for an RF interference event in block 404.

Otherwise, if the DSDA device determines that an RF interference event is detected (i.e., determination block 406="Yes"), the DSDA device may create an RF co-existence management strategy based on various factors in block 408. In various embodiments, the RF co-existence management strategy may mitigate the effects of the aggressor's de-sensing the victim. For example, the RF co-existence management strategy may change the characteristics or configurations of one or both of the victim and the aggressor during the aggressor's transmissions.

In an embodiment, the DSDA device may consider various factors when creating an RF co-existence management strategy, including: the identities and priorities of the victim and aggressor, the priorities of the signals the victim receives versus the signals the aggressor transmits, and the relative costs of implementing robust Rx processing on the victim or robust Tx processing at the aggressor. Creating an RF co-existence management strategy based on various factors is discussed in further detail below with reference to FIGS. 6 and 7.

In a further embodiment, the DSDA device may ultimately determine whether to implement robust Rx processing at the victim as part of the DSDA device's RF co-existence management strategy, as opposed to doing nothing or implementing robust Tx processing at the aggressor (e.g., configuring the aggressor to reduce its transmitter's gain during some of the victim's downlink slots). If the DSDA device decides not to implement robust Rx processing as part of the RF co-existence management strategy (i.e., determination block 410="No"), the DSDA device may not implement robust Rx processing, and this process may continue in a loop as the DSDA device may continue by monitoring for another RF interference event in block 404.

If the DSDA device decides to implement robust Rx processing as part of the RF co-existence management strategy (i.e., determination block 410="Yes"), the DSDA device may implement robust Rx processing on the victim in block 412 based on the determined RF co-existence management strategy. In various embodiments, the DSDA may implement robust Rx processing by configuring the victim to "defer" to the aggressor's transmitting. In other words, the aggressor may be allowed to transmit and the victim may perform actions to mitigate the effect of de-sense that the aggressor's transmissions may cause. The DSDA device's performance of robust Rx processing is described below in further detail with reference to FIGS. 9A and 9B.

In determination block 422, the DSDA device may determine whether the RF interference event is persisting. In other words, the DSDA device may determine whether the circumstances that created the RF interference event are ongoing. For example, the DSDA device may determine whether the aggressor is continuing to de-sense the victim during an ongoing schedule of Tx bursts.

If the DSDA device determines that the RF interference event is persisting (i.e., determination block 422="Yes"), the DSDA device may continue implementing the RF co-existence management strategy in block 424. The process may continue in a loop as the DSDA device may continue implementing the RF co-existence management strategy until the RF interference event has concluded (i.e., determination block 422="No").

If the DSDA device determines that the RF interference event is not persisting (i.e., determination block 422="No"), the DSDA device may return the victim and aggressor to normal operations in block 426. In other words, once the RF interference event has concluded (i.e., when the de-sensing situation has ended), the DSDA device may perform normally. In an embodiment, the DSDA device may discontinue implementing robust Rx processing for the victim. In another embodiment, the DSDA device may reinitialize one or more aspects of the victim and/or aggressor after implementing robust Rx processing. For example, the DSDA device may unfreeze the victim's automatic gain control ("AGC") loop frozen as part of the DSDA device's implementation of robust Rx processing.

The process may continue in a loop as the DSDA device may continue monitoring for an RF interference event in block 404 as described above.

Figure 5:
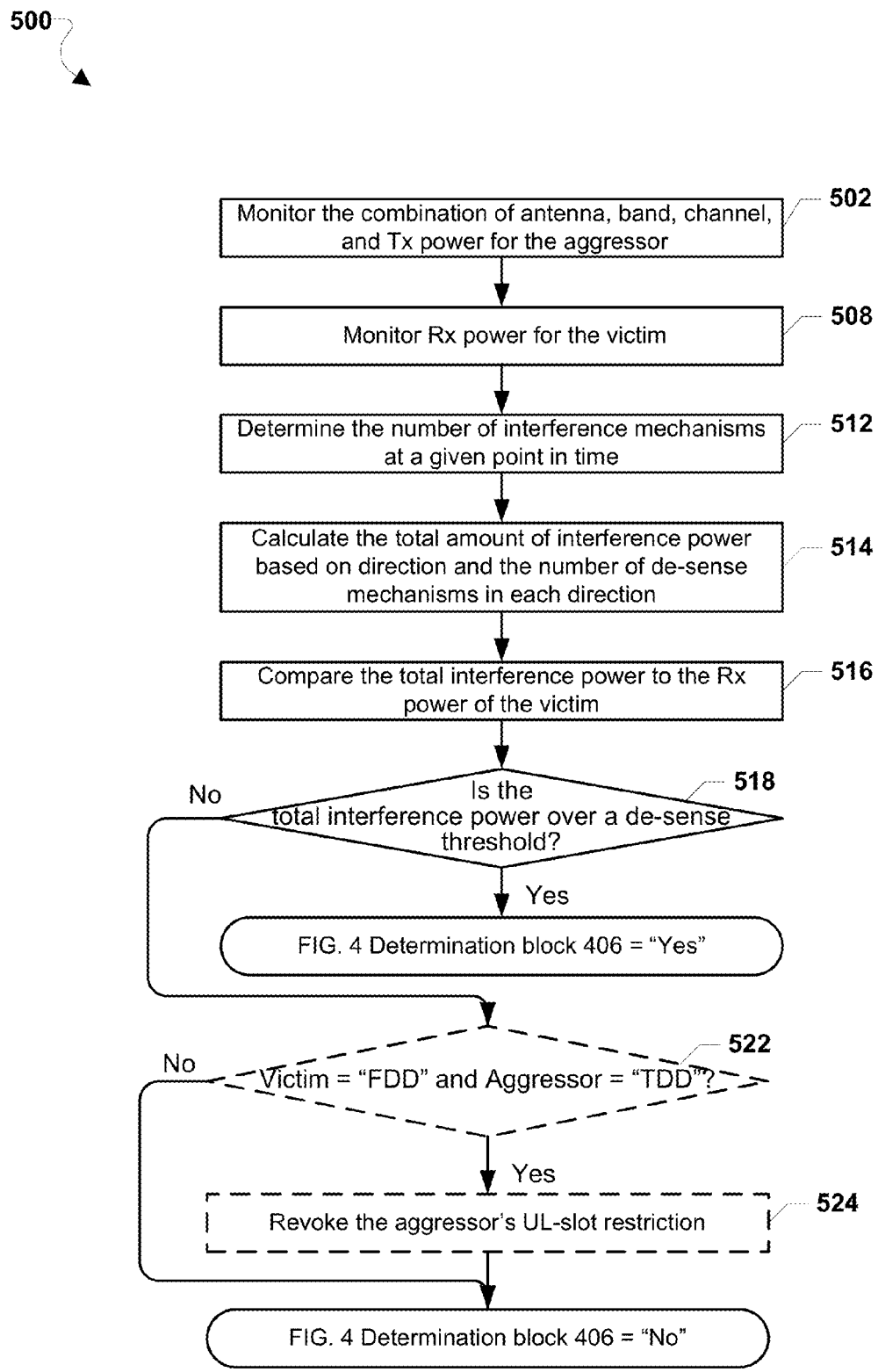
FIG. 5 is a process flow diagram illustrating an embodiment method for determining whether a victim is de-sensed above a de-sense threshold.

FIG. 5 illustrates an embodiment DSDA device method 500 for determining whether an RF interference event has occurred. In an embodiment, method 500 may expand on the actions the DSDA device performs in blocks 404 and 406 as described with reference to FIG. 4.

In various embodiments, the DSDA device may monitor various RF aspects associated with each of the two subscriptions included in the DSDA device to determine whether an RF interference event is occurring. In an embodiment, the DSDA device may determine whether an RF interference event is occurring based on various RF measurements and threshold checks, for example, by monitoring one or more sources of interference.

For example, in an embodiment, the DSDA device may monitor the combination of the antenna, band, channel, and transmitter power for the aggressor in block 502. In various embodiments, the DSDA device may monitor various gains and other electrical features regarding the two subscriptions.

In block 508, the DSDA device may monitor the receiver power for the victim. The DSDA device may additionally determine the number of interference mechanisms that exist at a given time in block 512.

In block 514, the DSDA device may calculate or estimate the total amount of interference power based on direction and the number of de-sense mechanisms in each direction. In an embodiment, the DSDA device's calculation may produce a value that signifies the total interference that may be affecting the receiver. In block 516, the DSDA device may compare that total interference power to the receiver power of the victim. The DSDA device may also determine in determination block 518 whether the total interference power is over a de-sense threshold value. In an embodiment, the de-sense threshold value may indicate the point at which the total interference power affecting the victim is "non-negligible." In other words, total interference powers that exceed the de-sense threshold value may substantially affect the performance of the victim such that implementing an RF co-existence management strategy would benefit the performance of at least one of the victim and the aggressor. On the other hand, a total interference power that does not exceed the de-sense threshold value may not affect the victim enough to warrant implementation of an RF co-existence management strategy because of the costs of implementing such a strategy.

If the DSDA device determines the total interference power exceed a de-sense threshold (i.e., determination block 518="Yes"), the DSDA device continue by determining that an RF interference event has been detected (i.e., determination block 406="Yes") as described above with reference to FIG. 4. In an embodiment, an RF interference event may be indicated when the total interference power exceeds a de-sense threshold.

Otherwise, if the DSDA device determines that the total interference power does not exceed a de-sense threshold (i.e., determination block 518="No"), the DSDA device may optionally determine in optional determination block 522 whether the victim uses a FDD radio technology and whether the aggressor uses a TDD radio technology. If the victim uses FDD radio technology and the aggressor uses TDD radio technology (i.e., optional determination block 522="Yes"), the DSDA device may optionally revoke the aggressor's uplink-slot restriction in optional block 524. In an embodiment, the aggressor's uplink slots may be restricted to less than its full uplink slot capacity (e.g., an uplink slot restriction of only two uplink slots) when the DSDA device determines that the RF interference event is persistent as discussed below in relation to FIG. 7. In this embodiment, the DSDA device may revoke the aggressor's uplink-slot restriction when there is no actionable de-sense (i.e., when the de-sense is below the de-sense threshold). The DSDA device may continue by determining that no RF co-existence interference event has been detected in determination block 406 (i.e., determination block 406="No") as described above with reference to FIG. 4.

If the victim does not use FDD radio technology (e.g., WCDMA/CDMA) or the aggressor does not use TDD radio technology (e.g., GSM) (i.e., optional determination block 522="No"), the DSDA device may continue by determining that no RF interference event has been detected in determination block 406 (i.e., determination block 406="No") as described above with reference to FIG. 4. In other words, when determination block 406="No," the total power inter-ference may not be sufficient to cause the DSDA device to implement an RF co-existence management system because the costs of implementing such a system would be greater than the benefit of that system.

Figure 6:
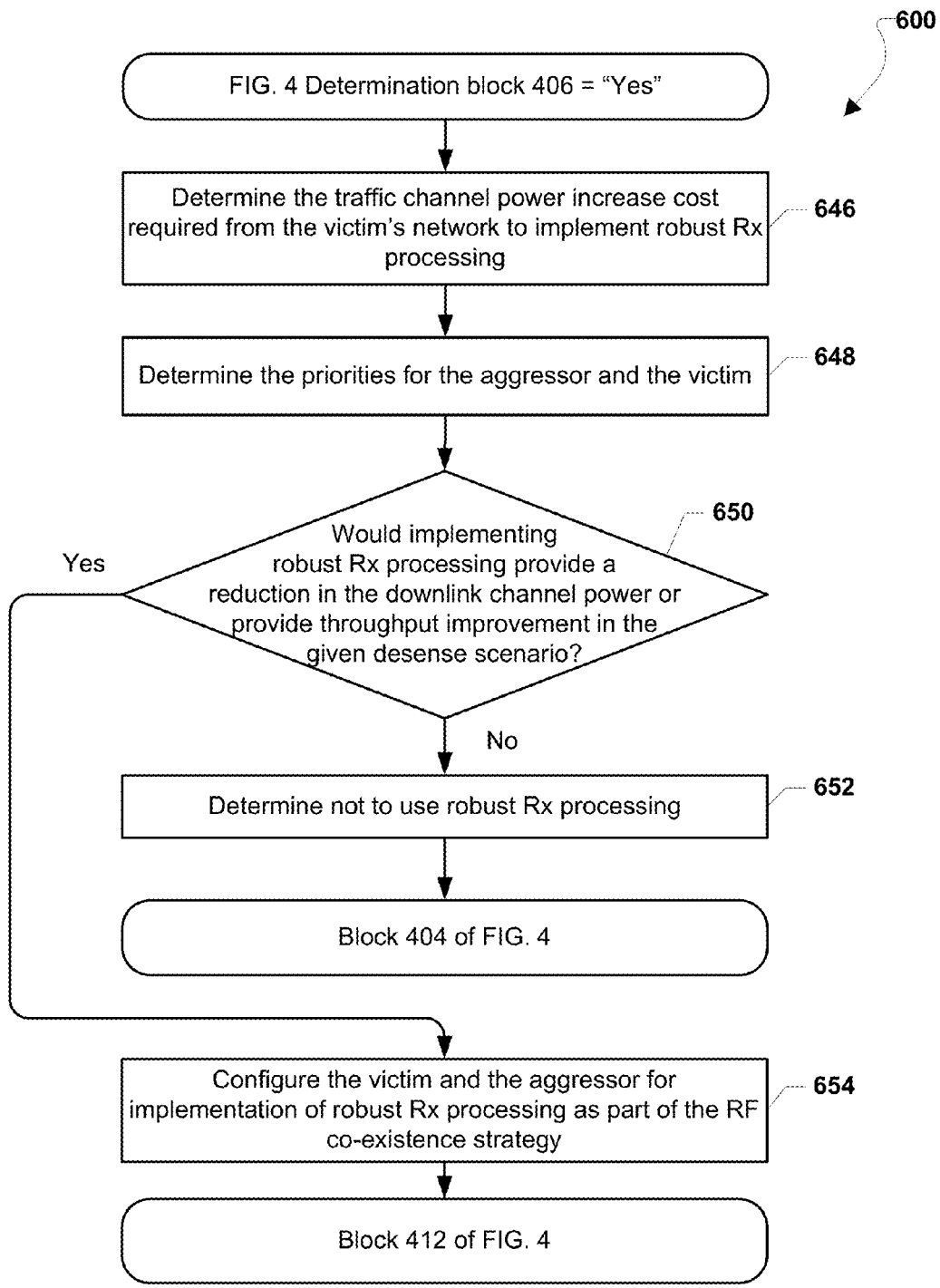
FIG. 6 is a process flow diagram illustrating an embodiment method for determining whether to implement robust Rx processing.

FIG. 6 illustrates an embodiment DSDA device method 600 for creating an RF coexistence management strategy. The DSDA device may begin performing method 600 after detecting an RF interference event (i.e., determination block 406="Yes") as described above with reference to FIG. 4.

In block 646, the DSDA device may determine the traffic channel power increase cost required from the victim's network in order to implement robust Rx processing. In block 648, the DSDA device may also determine the priorities of the aggressor and the victim.

In an embodiment, robust Rx processing may incur a cost on the link-level performance of the technology being processed (e.g., WCDMA/CDMA), and, therefore, the DSDA device may assess whether the costs of robust Rx processing are greater than the benefit of invoking robust Rx processing. In another embodiment, robust Rx processing may increase the traffic channel power needed for the victim's network to maintain a target block error rate or frame error rate. Thus, the amount of degradation for the victim's network goes up as the duration of robust Rx processing increases.

In determination block 650, the DSDA device may determine whether implementing robust Rx processing would provide a reduction in the downlink channel power or provide throughput improvement in the given de-sense scenario. In an embodiment, implementing robust Rx processing will only reduce the downlink channel power compared to taking no action (i.e., allowing the victim to continue being de-sensed). While implementing robust Rx processing incurs a cost in terms of downlink power compared to when the victim is not being de-sensed, the cost of implementing robust Rx processing is typically smaller than the costs of not mitigating the victim's de-sense.

In another embodiment, when determining whether to implement robust Rx processing, the DSDA device may additionally consider the priorities of the victim and the aggressor and/or the cost of increasing the victim's network's channel power to perform robust Rx processing.

When implementing robust Rx processing would not provide a reduction in the downlink channel power and would not provide throughput improvement in the given de-sense scenario (i.e., determination block 650="No"), the DSDA device may determine not to implement robust Rx processing in block 652. In an embodiment, in that event, the DSDA device may not implement robust Rx processing because the benefits of implementing robust Rx processing may not outweigh the costs of implementing robust Rx processing. The DSDA device may continue performing by monitoring for an RF interference event in block 404 of method 400 described above with reference to FIG. 4.

On the other hand, when implementing robust Rx processing would provide a reduction in the downlink channel power or would provide throughput improvement in the given de-sense scenario (i.e., determination block 650="Yes"), the DSDA device may configure the victim and the aggressor for implementation of robust Rx processing as part of the RF co-existence strategy in block 654. The DSDA device may continue performing by implementing robust Rx processing in block 412 of method 400 described above with reference to FIG. 4.

Figure 7:
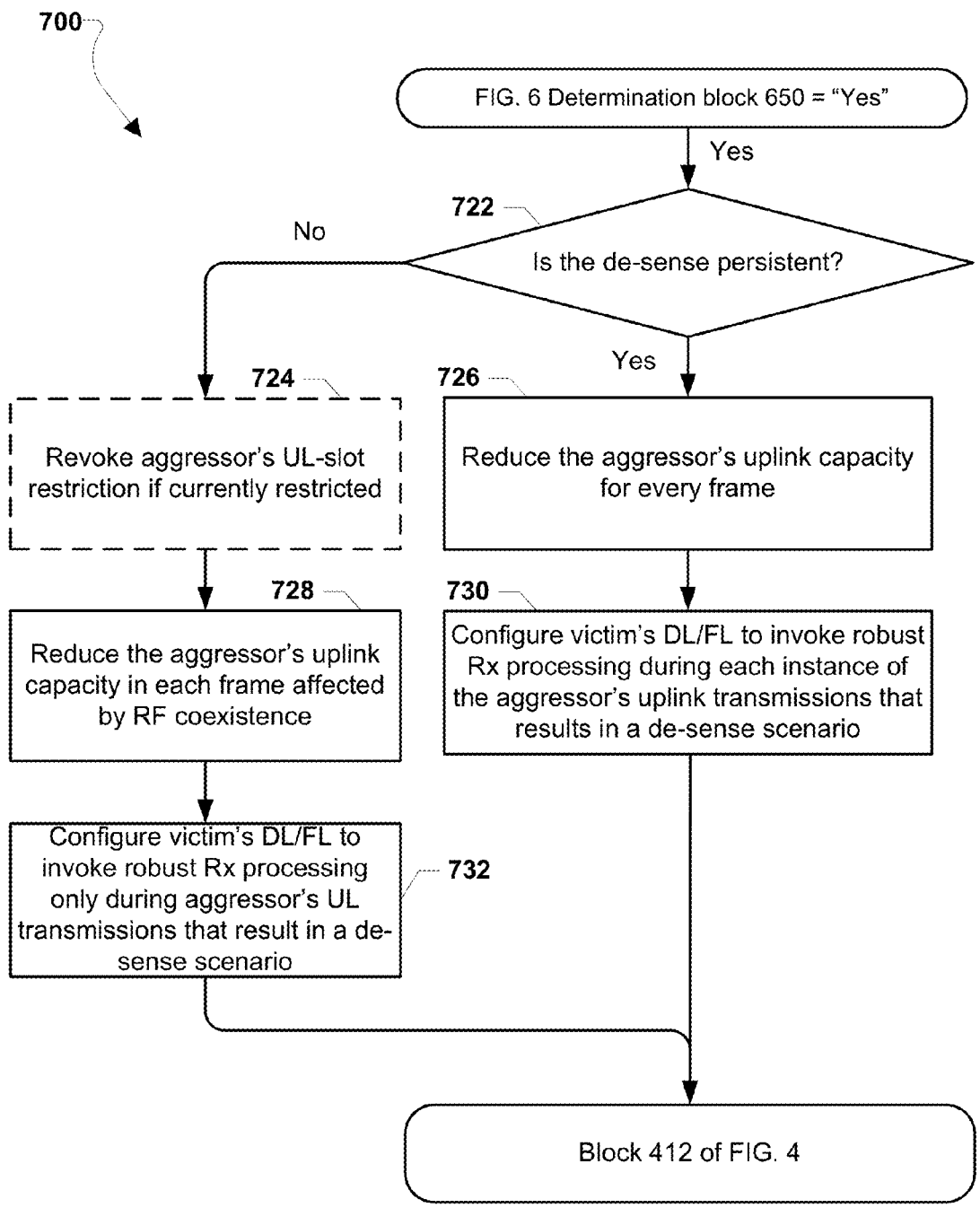
FIG. 7 is a process flow diagram illustrating an embodiment method for configuring an RF co-existence management strategy.

FIG. 7 illustrates an embodiment DSDA device method 700 for configuring the victim and the aggressor for implementation of robust Rx processing. In such an embodiment, the DSDA device may have determined in block 402 of method 400 described above with reference to FIG. 4 that the victim uses a FDD radio technology and that the aggressor uses a TDD radio technology. For example, the victim may use WCDMA/CDMA technology and the aggressor may use GSM. The DSDA device may begin performing method 700 after determining that implementing robust Rx processing would provide a reduction in the downlink channel power or a throughput improvement in the given de-sense scenario (i.e., determination block 650="Yes").

In determination block 722, the DSDA device may determine whether the de-sense is persistent. In an embodiment, if the aggressor performs frequency hopping, such as when using GSM, the DSDA device may determine whether the de-sense is persistent by determining whether a minimum threshold percentage (i.e., a persistence threshold) of hopping frequencies are in a de-sense scenario. In a further embodiment, the DSDA device may determine that the de-sense is transitory (i.e., not persistent) if the persistent threshold amount of hopping frequencies do not meet or exceed the persistence threshold. In another embodiment in which the aggressor does not perform frequency hopping, the DSDA device may determine that the de-sense is persistent when the frequency utilized by the aggressor is in a de-sense scenario.

If the DSDA device determines that the de-sense is persistent because the persistence threshold has been met or exceeded (i.e., determination block 722="Yes"), the DSDA device may reduce the aggressor's uplink slot capacity for every frame in block 726. The DSDA device may also configure the victim's downlink/forward-link in block 730 to invoke robust Rx processing during each instance of the aggressor's uplink transmissions that results in a de-sense scenario. The DSDA device may continue performing by implementing robust Rx processing in block 412 of method 400 described above with reference to FIG. 4.

If the DSDA device determines that the de-sense is not persistent (i.e., determination block 722="No"), the DSDA device may optionally revoke the aggressor's uplink-slot restriction if the aggressor is currently restricted in optional block 724. For example, the DSDA device may optionally revoke the aggressor's uplink-slot restriction that the DSDA device may set in block 726 if the de-sense goes from persistent to transient, such as if the number of hopping frequencies that cause de-sensing is reduced below the persistence threshold.

In block 728, the DSDA device may reduce the aggressor's uplink slot capacity in each frame that is affected by RF coexistence. For example, for every GSM frame in which the aggressor transmits, the aggressor may be limited to two or fewer uplink slots in which to transmit. In block 732, the DSDA device may configure the victim's downlink/forward link to invoke robust Rx processing only during the aggressor's uplink transmissions that result in a de-sense scenario. In an embodiment, no robust Rx processing may be needed if the aggressor does not transmit on an uplink slot.

In an embodiment, the DSDA device's actions when the de-sense is transient may be similar to those performed when the de-sense is persistent; however, when the de-sense is transient, the DSDA device may not diminish the aggressor's full transmitting capacity. In other words, the difference between reducing uplink capacity of the aggressor when the de-sense is persistent versus transient may be that the aggressor's uplink capacity is reduced for every frame when the de-sense is persistent and only in frames affected by de-sense when the de-sense is transient.

The DSDA device may continue performing by implementing robust Rx processing on the victim based on the determined RF co-existence management strategy in block 412 of method 400 described above with reference to FIG. 4.

Figure 8:
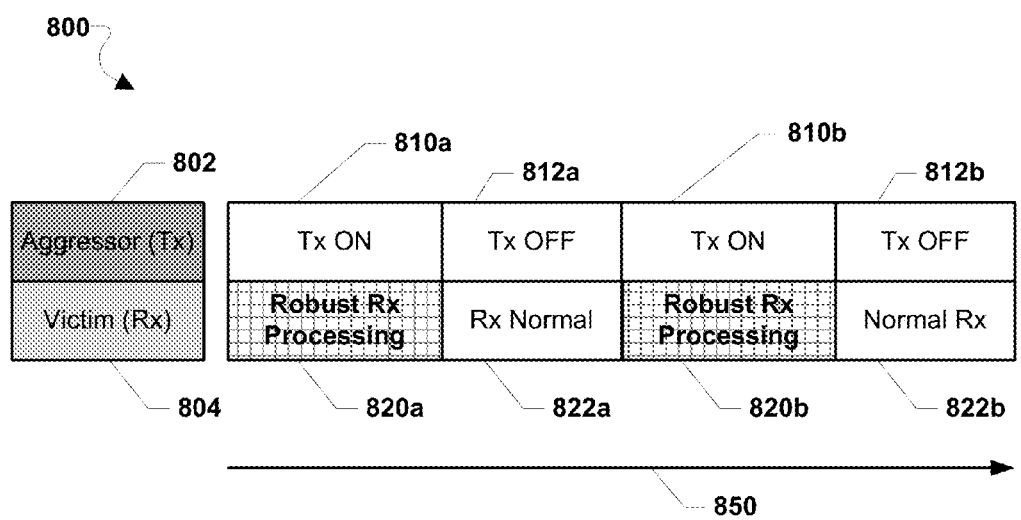
FIG. 8 is a component diagram illustrating RF interference events.

FIG. 8 illustrates an embodiment block diagram 800 demonstrating a robust Rx processing situation between a victim and an aggressor during an RF interference event.

In an embodiment, an aggressor 802 and victim 804 may each be a subscription with access to an RF chain for transmitting and receiving. In this embodiment, the aggressor 802 may be currently attempting to transmit and the victim 804 may be currently attempting to receive transmissions. This circumstance, in which one subscription is attempting to transmit (i.e., the aggressor 802) and the other subscription is attempting to receive a transmission (i.e., the victim 804), may refer to an RF interference event 850. In a further embodiment, the DSDA device may perform various actions to manage the RF interference event 850.

In an embodiment, during an RF interference event 850, the DSDA device may implement an RF co-existence management strategy, which may include requiring the victim 804 to implement robust Rx processing during the transmission of the aggressor 802. For example, when the aggressor 802 is transmitting (e.g., transmission periods 810a and 810b), the victim 804 may be configured to implement corresponding periods of robust Rx processing 820a and 820b. In another embodiment, during periods when the aggressor 802 is not transmitting (e.g., non-transmission periods 812a and 812b), the victim 804 may experience corresponding periods of normal receiving 822a and 822b. Thus, in the various embodiments, by implementing robust Rx processing while the aggressor 802 is transmitting, the victim 804 may minimize performance impact that the aggressor's transmissions cause.

Figure 9A:
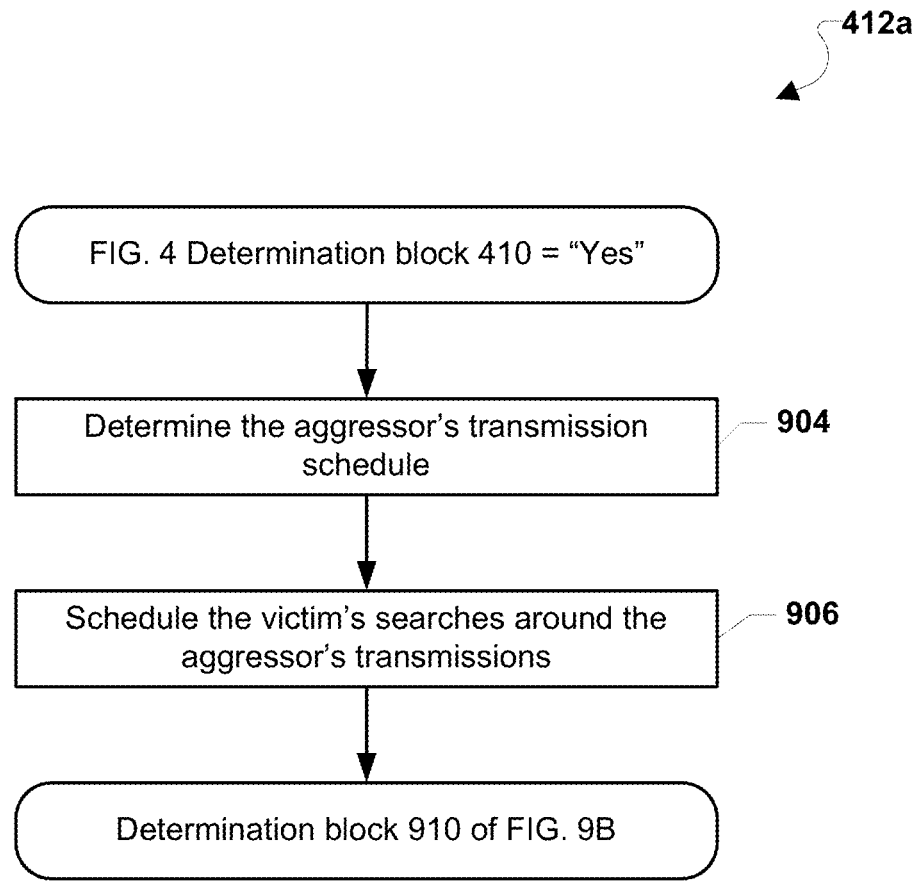
FIGS. 9A-9B are process flow diagrams illustrating embodiment methods for implementing robust Rx processing.
Figure 9B:
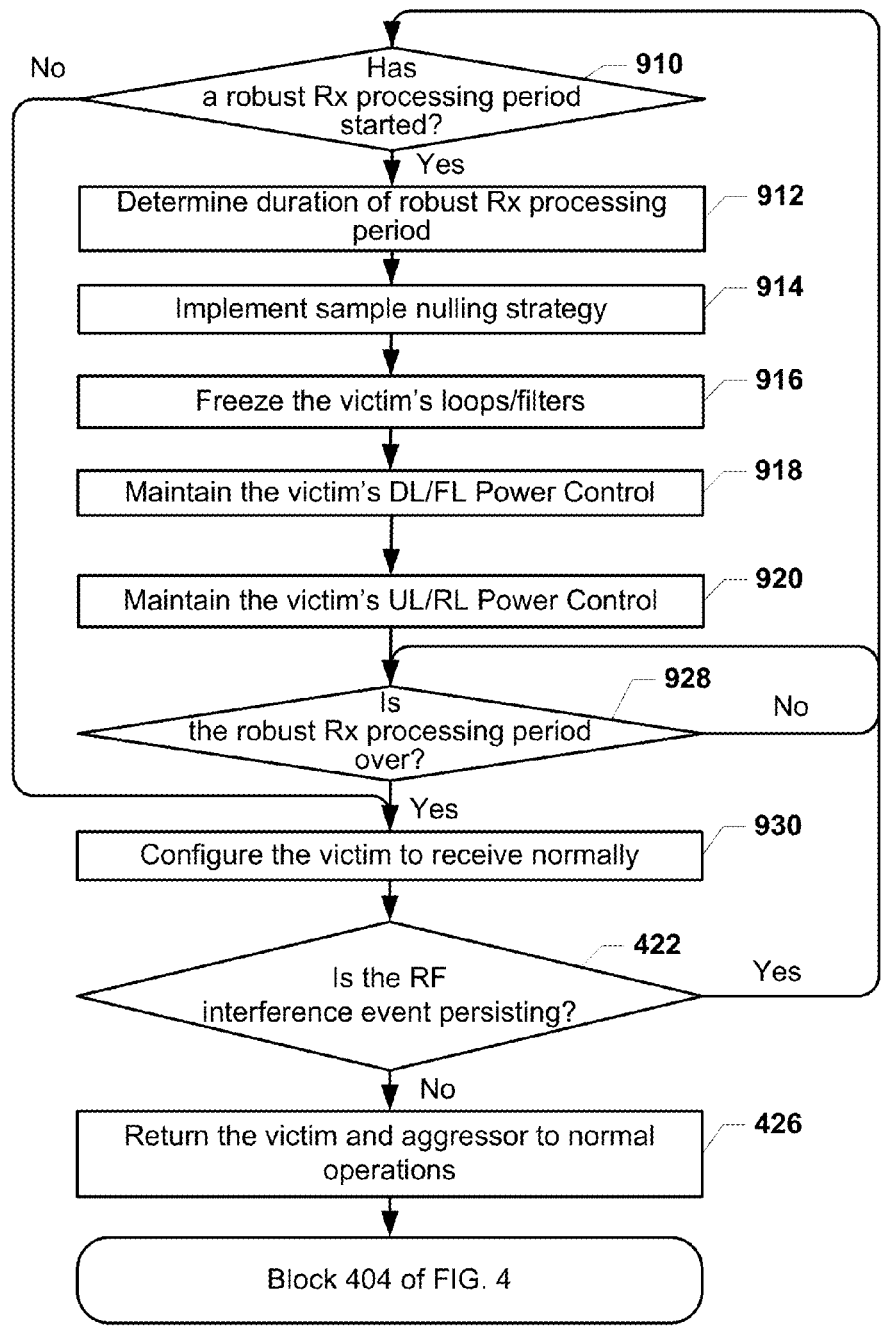

FIGS. 9A and 9B collectively illustrate an embodiment DSDA device method 412a for implementing robust Rx processing on a DSDA device. The DSDA device may begin the method 412a after determining to implement robust Rx processing as a part of the RF co-existence management strategy (i.e., determination block 410="Yes").

In block 904, the DSDA device may determine the aggressor's transmission schedule. In an embodiment, the DSDA device or a specialized RF co-existence manager circuit may provide the aggressor's uplink timing to the victim. In another embodiment, the victim may determine the aggressor's transmission schedule through detection. In a further embodiment, if genie timing information is not available, the victim may detect the presence of aggressor based on measurement such as the fluctuation of the receiver's AGC level, inphase/quadrature phase sample saturation, etc.

The DSDA device may schedule the victim's searches in block 906 around the aggressor's transmission (i.e., around the periods of time in which the aggressor is transmitting). In an embodiment when the aggressor is GSM, scheduling searches around the aggressor's transmissions enables the victim to obtain better measurement results and mobility management. In another embodiment, the DSDA device may configure the victim to increase the integration length for long searches. The DSDA device may continue performing method 412a by determining whether a robust Rx processing period has started in determination block 910 described below with reference to FIG. 9B.

In FIG. 9B, the DSDA device may determine in determination block 910 whether a robust Rx processing period has started. In various embodiments (and as described with reference to in FIG. 8), implementing robust Rx processing may require the victim to undergo alternating periods of performing robust Rx processing (e.g., periods 820a, 820b) and periods of receiving normally (e.g., periods 822a, 822b). The periods may correspond, respectively, with when the aggressor is transmitting (e.g., periods 810*a*, 810*b*) and when the aggressor is not transmitting (e.g., periods 812*a*, 812*b*). If the DSDA device determines that a robust Rx processing period has not started (i.e., determination block 910="No" because, in an embodiment, the aggressor is not currently transmitting), the DSDA device may configure the victim to receive normally in block 930.

However, if the DSDA device determines that a robust Rx processing period has started (i.e., determination block 910="Yes" because, in an embodiment, the aggressor is transmitting), the DSDA device may determine the duration of the robust Rx processing period in block 912. In an embodiment, the DSDA device may determine the duration of the robust Rx processing period in various ways, such as receiving the aggressor's transmitter schedule or through detection of the transmitter's transmission pattern.

In block 914, the DSDA device may implement a sample nulling strategy. In an embodiment, the DSDA device may determine whether the current conditions would make robust Rx processing effective. This nulling strategy is discussed in further detail with reference to FIG. 10.

In block 916, the DSDA device may freeze the victim's loops and/or filters. In an embodiment, the loops and filters may include, for example, a low-noise amplifier, an automatic gain control, a pilot filter, a received signal strength indication, noise power, time-tracking loop and/or frequency-tracking loop, channel estimation, covariance, and carrier-to-interference estimation. In another embodiment (not shown), instead of freezing loops and filters, the DSDA device may instead increase the loop bandwidths at the victim's receiver (e.g., DC loop, automatic gain control, etc.).

In block 918, the DSDA device may maintain the victim's downlink/forward link power control. The DSDA device may also maintain the victim's uplink/reverse link power control in block 920. In an embodiment, the DSDA device may reject uplink transmission power controller if it overlaps with the aggressor.

The DSDA device may also determine in determination block 928 whether the robust Rx processing period is over. If the robust Rx processing period is not over (i.e., determination block 928="No"), the DSDA device may continuously repeat the process in determination block 928 to recognize when the robust Rx processing period is over. In an embodiment, the robust Rx processing period may not be over because the aggressor may still be transmitting. Otherwise, if the DSDA device determines that the robust Rx processing period is over (i.e., determination block 928="Yes"), the DSDA device may configure the victim to receive normally in block 930. In an embodiment, configuring the victim to receive normally may include unfreezing the loops and filters and discontinuing nulling received samples.

The DSDA device may determine in determination block 422 whether the RF interference event is persisting. In an embodiment, the DSDA device may attempt to determine if the RF interference event has concluded. In other words, the DSDA device may determine whether the two subscriptions are experiencing RF co-existence, wherein one subscription is attempting to transmit while the other subscription is attempting to receive.

If the DSDA device determines that the RF interference event is persisting (i.e., determination block 422="Yes"), the process may continue in a loop as the DSDA device may continue by determining whether a robust Rx processing period has started in determination block 910. Otherwise, if the DSDA device determines that the RF interference event is not persisting (i.e., determination block 422="No"), the DSDA device may return the victim and the aggressor to normal operations in block 426 as described above with reference to FIG. 4. The DSDA device may continue performing by monitoring for another RF interference event in block 404 of method 400 described above with reference to FIG. 4.

Figure 10:
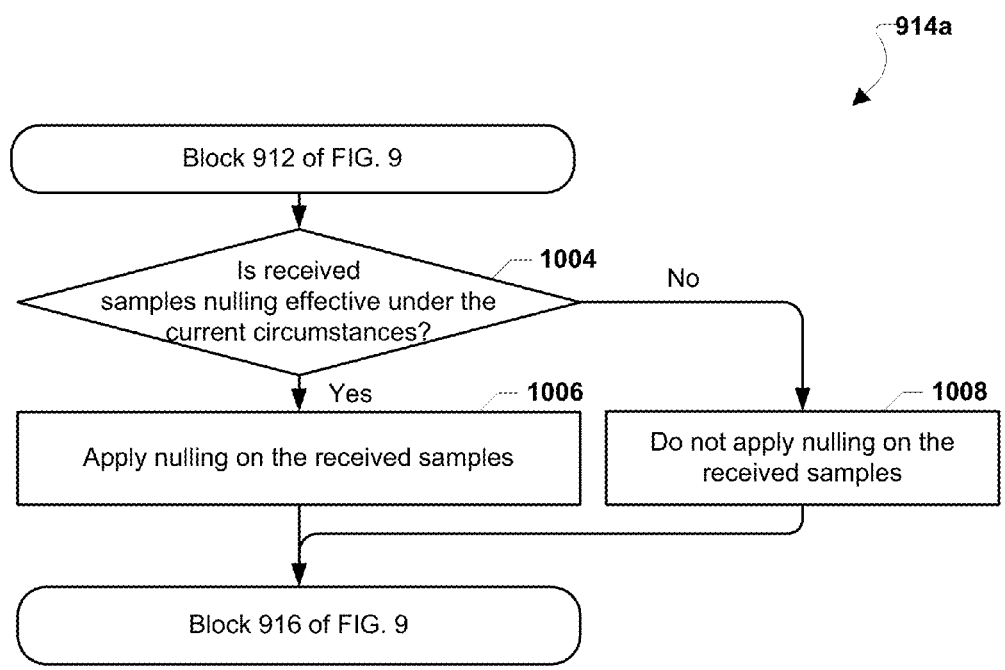
FIG. 10 is a process flow diagram illustrating an embodiment method for implementing a nulling strategy.

FIG. 10 illustrates an embodiment DSDA device method 914*a* for implementing a nulling strategy. In various embodiments, the DSDA device may implement a particular nulling strategy based on the victim's radio access technology. The DSDA device may begin method 914*a* after determining the duration of the robust Rx processing period in block 912 of method 412*a* described above with reference to FIG. 9B.

In determination block 1004, the DSDA device may determine whether nulling the received samples is effective under the current circumstances. In an embodiment, implementing nulling may benefit the victim under some circumstances and not others. For example, depending on the victim's radio technology, nulling may provide gains in almost all scenarios in which a GSM aggressor's interference is present.

In an embodiment, the DSDA device may determine whether implementing nulling would be effective based on, for example, the level of the de-sense affecting the victim and the nature of the downlink channel. In another embodiment, the DSDA device may determine whether nulling is effective based on whether the aggressor's Tx period exceeds a certain threshold, whereby nulling is only effective when the Tx period exceeds that certain threshold. For example, the DSDA device may determine whether nulling is effective under the current circumstances based on measuring the geometry and decibels over thermal and comparing them to certain thresholds. In a further example, implementing nulling may be effective when the measure interference is 30 dB over thermal in some cases.

If the DSDA device determines that nulling the received samples is effective under the circumstances (i.e., determination block 1004="Yes"), the DSDA device may apply nulling on the received samples in block 1006. In an embodiment, the DSDA device may apply nulling on the received samples by zeroing out the values of the received samples. In a further embodiment, the DSDA device may only null samples received on certain channels or datapaths. The DSDA device may continue performing by freezing the victim's loops and/or filters in block 916 of method 412*a* described above with reference to FIG. 9B.

Otherwise, if the DSDA device determines that nulling the received samples is not effective under the circumstances (i.e., determination block 1004="No"), the DSDA may not apply nulling on the received samples in block 1008. In an embodiment, the victim may perform actions to mitigate the de-sense from the aggressor's transmitter without nulling received samples. For example, the victim may freeze various loops and filters as described in relation to FIGS. 9A and 9B despite not nulling received samples. The DSDA device may continue performing by freezing the victim's loops and/or filters in block 916 of method 412*a* described above with reference to FIG. 9B.

Figure 11:
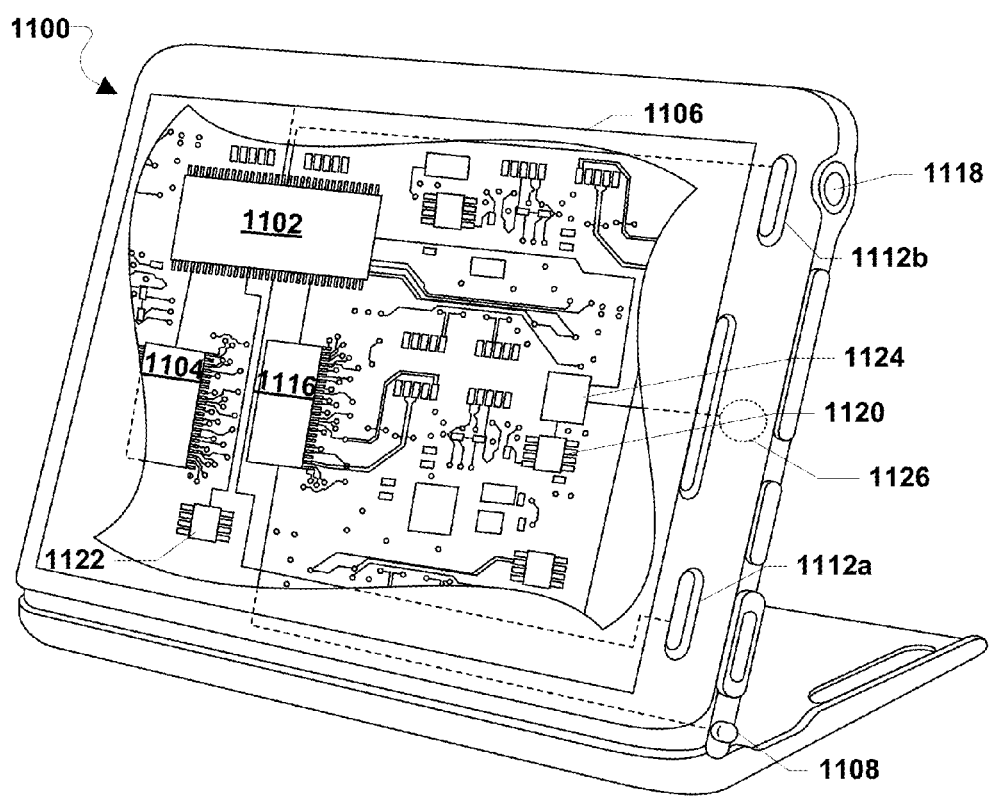
FIG. 11 is a component diagram of an example DSDA device suitable for use with the various embodiments.

The various embodiments may be implemented in any of a variety of DSDA devices, an example of which is illustrated in FIG. 11. For example, the DSDA device 1100 may include a processor 1102 coupled to internal memory 1104. Internal memory 1104 may be volatile or non-volatile memory, and may also be secure and/or encrypted memory, or unsecure and/or unencrypted memory, or any combination thereof. The processor 1102 may also be coupled to a touch screen display 1106, such as a resistive-sensing touch screen, capacitive-sensing touch screen infrared sensing touch screen, or the like. Additionally, the display of the DSDA device 1100 need not have touch screen capability. Additionally, the DSDA device 1100 may have one or more antenna 1108 for sending and receiving electromagnetic radiation that may be connected to a wireless data link and/or cellular telephone transceiver 1116 coupled to the processor 1102. The DSDA device 1100 may also include physical buttons 1112a and 1112b for receiving user inputs. The DSDA device 1100 may also include a power button 1118 for turning the DSDA device 1100 on and off. The DSDA device 1100 may have a first SIM card 1120 that utilize a cellular telephone transceiver 1116 and one or more antennae 1108 to connect to a first mobile network. The DSDA device may also have a second SIM card 1122 that utilizes a second cellular telephone transceiver 1124 and one or more antennae 1126 to connect to a second mobile network The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for implementing a radio frequency (RF) co-existence management strategy on a wireless device between an aggressor communication activity ("aggressor") and a victim communication activity ("victim"), comprising:
   determining whether an RF interference event is detected;
   creating an RF co-existence management strategy in response to determining that the RF interference event is detected;
   determining whether to implement robust receive (Rx) processing as part of the RF co-existence management strategy;
   configuring the victim for implementation of the robust Rx processing in response to determining to implement the robust Rx processing, comprising:
      determining whether de-sense is persistent by determining whether a number of aggressor hopping frequencies that result in de-sense exceeds a minimum percentage; and
   implementing the robust Rx processing on the victim in response to determining to implement the robust Rx processing as part of the RF co-existence management strategy.

2. The method of claim 1, further comprising:
   determining whether the RF interference event is persisting;
   returning the victim to normal operations in response to determining that the RF interference event is not persisting; and
   continuing to implement the RF co-existence management strategy in response to determining that the RF interference event is persisting.

3. The method of claim 1, wherein determining whether the RF interference event is detected comprises:
monitoring one or more sources of interference;
calculating a total amount of interference power based on one or more sources of interference;
determining whether the total amount of interference power exceeds a de-sense threshold; and
determining that the RF interference event is detected when the total amount of interference power exceeds the de-sense threshold.

4. The method of claim 1, wherein creating the RF co-existence management strategy in response to determining that the RF interference event is detected comprises:
determining whether implementing the robust Rx processing would reduce a downlink channel power or improve throughput; and
determining to implement the robust Rx processing in response to determining that implementing robust Rx processing would reduce the downlink channel power or improve throughput.

5. The method of claim 1, further comprising performing the following in response to determining that the de-sense is persistent:
reducing an uplink capacity of the aggressor for every frame; and
configuring a downlink of the victim to invoke the robust Rx processing during each instance of an uplink transmission of the aggressor that results in a de-sense scenario.

6. The method of claim 1, further comprising performing the following in response to determining that the de-sense is not persistent:
revoking an uplink slot restriction of the aggressor when the aggressor is currently restricted;
reducing uplink capacity of the aggressor in each frame affected by RF coexistence; and
configuring the victim to invoke the robust Rx Processing only during an uplink transmission of the aggressor that result in a de-sense scenario.

7. The method of claim 1, wherein implementing the robust Rx processing comprises at least one of:
implementing a sample nulling strategy;
freezing loops and filters of the victim; and
maintaining a power control of the victim.

8. The method of claim 7, further comprising:
determining a transmission schedule of the aggressor; and
configuring the victim to receive signals when the aggressor is not transmitting.

9. The method of claim 7, further comprising:
determining a duration of a robust Rx processing period;
determining whether the robust Rx processing period has expired; and
configuring the victim to receive normally when the robust Rx processing period has expired.

10. The method of claim 7, wherein freezing loops and filters of the victim comprises freezing one or more of a low-noise amplifier, an automatic gain control, a pilot filter, a received signal strength indication, noise power, a time-tracking loop, a frequency-tracking loop, channel estimation, covariance, and carrier-to-interference estimation.

11. A wireless device, comprising:
a plurality of radio frequency (RF) resources; and
a processor coupled to the plurality of RF resources, wherein the processor is configured with processor-executable instructions to:
determine whether an RF interference event between an aggressor communication activity ("aggressor") and a victim communication activity ("victim") is detected;
create an RF co-existence management strategy in response to determining that the RF interference event is detected;
determine whether to implement robust receive (Rx) processing as part of the RF co-existence management strategy;
configure the victim for implementation of the robust Rx processing in response to determining to implement the robust Rx processing by:
determining whether de-sense is persistent by determining whether a number of aggressor hopping frequencies that result in de-sense exceeds a minimum percentage; and
implement robust Rx processing on the victim in response to determining to implement the robust Rx processing as part of the RF co-existence management strategy.

12. The wireless device of claim 11, wherein the processor is further configured with processor-executable instructions to:
determine whether the RF interference event is persisting;
return the victim to normal operations in response to determining that the RF interference event is not persisting; and
continue to implement the RF co-existence management strategy in response to determining that the RF interference event is persisting.

13. The wireless device of claim 11, wherein the processor is configured with processor-executable instructions to determine whether the RF interference event is detected by:
monitoring one or more sources of interference;
calculating a total amount of interference power based on one or more sources of interference;
determining whether the total amount of interference power exceeds a de-sense threshold; and
determining that the RF interference event is detected when the total amount of interference power exceeds the de-sense threshold.

14. The wireless device of claim 11, wherein the processor is configured with processor-executable instructions to create the RF co-existence management strategy in response to determining that the RF interference event is detected by:
determining whether implementing the robust Rx processing would reduce a downlink channel power or improve throughput; and
determining to implement the robust Rx processing in response to determining that implementing robust Rx processing would reduce the downlink channel power or improve throughput.

15. The wireless device of claim 11, wherein the processor is configured with processor-executable instructions to perform the following in response to determining that the de-sense is persistent:
reducing an uplink capacity of the aggressor for every frame; and
configuring a downlink of the victim to invoke the robust Rx processing during each instance of an uplink transmission of the aggressor that results in a de-sense scenario.

16. The wireless device of claim 11, wherein the processor is configured with processor-executable instructions to perform the following in response to determining that the de-sense is not persistent:

revoking an uplink slot restriction of the aggressor when the aggressor is currently restricted;
reducing uplink capacity of the aggressor in each frame affected by RF coexistence; and
configuring the victim to invoke the robust Rx Processing only during an uplink transmission of the aggressor that result in a de-sense scenario.

17. The wireless device of claim 11, wherein the processor is configured with processor-executable instructions to perform operations such that implementing the robust Rx processing comprises at least one of:
implementing a sample nulling strategy;
freezing loops and filters of the victim; and
maintaining a power control of the victim.

18. The wireless device of claim 17, wherein the processor is further configured with processor-executable instructions to:
determine a transmission schedule of the aggressor; and
configure the victim to receive signals when the aggressor is not transmitting.

19. The wireless device of claim 17, wherein the processor is further configured with processor-executable instructions to:
determine a duration of a robust Rx processing period;
determine whether the robust Rx processing period has expired; and
configure the victim to receive normally when the robust Rx processing period has expired.

20. The wireless device of claim 17, wherein the processor is configured with processor-executable instructions to freeze loops and filters of the victim comprises freezing one or more of a low-noise amplifier, an automatic gain control, a pilot filter, a received signal strength indication, noise power, a time-tracking loop, a frequency-tracking loop, channel estimation, covariance, and carrier-to-interference estimation.

21. A wireless device, comprising:
means for determining whether a radio frequency (RF) interference event between an aggressor communication activity ("aggressor") and a victim communication activity ("victim") is detected;
means for creating an RF co-existence management strategy in response to determining that the RF interference event is detected;
means for determining whether to implement robust receive (Rx) processing as part of the RF co-existence management strategy;
means for configuring the victim for implementation of the robust Rx processing in response to determining to implement the robust Rx processing, comprising:
means for determining whether de-sense is persistent further comprising means for determining whether a number of aggressor hopping frequencies that result in de-sense exceeds a minimum percentage; and
means for implementing the robust Rx processing on the victim in response to determining to implement the robust Rx processing as part of the RF co-existence management strategy.

22. The wireless device of claim 21, further comprising:
means for determining whether the RF interference event is persisting;
means for returning the victim to normal operations in response to determining that the RF interference event is not persisting; and
means for continuing to implement the RF co-existence management strategy in response to determining that the RF interference event is persisting.

23. The wireless device of claim 21, wherein means for determining whether the RF interference event is detected comprises:
means for monitoring one or more sources of interference;
means for calculating a total amount of interference power based on one or more sources of interference;
means for determining whether the total amount of interference power exceeds a de-sense threshold; and
means for determining that the RF interference event is detected when the total amount of interference power exceeds the de-sense threshold.

24. The wireless device of claim 21, wherein means for creating the RF co-existence management strategy in response to determining that the RF interference event is detected comprises:
means for determining whether implementing the robust Rx processing would reduce a downlink channel power or improve throughput; and
means for determining to implement the robust Rx processing in response to determining that implementing robust Rx processing would reduce the downlink channel power or improve throughput.

25. The wireless device of claim 21, further comprising means for performing the following in response to determining that the de-sense is persistent:
reducing an uplink capacity of the aggressor for every frame; and
configuring a downlink of the victim to invoke the robust Rx processing during each instance of an uplink transmission of the aggressor that results in a de-sense scenario.

26. The wireless device of claim 21, further comprising means for performing the following in response to determining that the de-sense is not persistent:
revoking an uplink slot restriction of the aggressor when the aggressor is currently restricted;
reducing uplink capacity of the aggressor in each frame affected by RF coexistence; and
configuring the victim to invoke the robust Rx Processing only during an uplink transmission of the aggressor that result in a de-sense scenario.

27. The wireless device of claim 21, wherein means for implementing the robust Rx processing comprises at least one of:
means for implementing a sample nulling strategy;
means for freezing loops and filters of the victim; and
means for maintaining a power control of the victim.

28. The wireless device of claim 27, further comprising:
means for determining a transmission schedule of the aggressor; and
means for configuring the victim to receive signals when the aggressor is not transmitting.

29. The wireless device of claim 27, further comprising:
means for determining a duration of a robust Rx processing period;
means for determining whether the robust Rx processing period has expired; and
means for configuring the victim to receive normally when the robust Rx processing period has expired.

30. The wireless device of claim 27, wherein means for freezing loops and filters of the victim comprises means for freezing one or more of a low-noise amplifier, an automatic gain control, a pilot filter, a received signal strength indication, noise power, a time-tracking loop, a frequency-tracking loop, channel estimation, covariance, and carrier-to-interference estimation.

31. A non-transitory processor-readable storage medium having stored thereon processor-executable software instructions configured to cause a processor of a wireless device to perform operations comprising:
- determining whether a radio frequency (RF) interference event between an aggressor communication activity ("aggressor") and a victim communication activity ("victim") is detected;
- creating an RF co-existence management strategy in response to determining that the RF interference event is detected; determining whether to implement robust receive (Rx) processing as part of the RF co-existence management strategy;
- configuring the victim for implementation of the robust Rx processing in response to determining to implement the robust Rx processing, comprising:
  - determining whether de-sense is persistent by determining whether a number of aggressor hopping frequencies that result in de-sense exceeds a minimum percentage; and
- implementing robust Rx processing on the victim in response to determining to implement the robust Rx processing as part of the RF co-existence management strategy.

32. The non-transitory processor-readable storage medium of claim 31, wherein the stored processor-executable software instructions are configured to cause a processor of a wireless device to perform operations further comprising:
- determining whether the RF interference event is persisting;
- returning the victim to normal operations in response to determining that the RF interference event is not persisting; and
- continuing to implement the RF co-existence management strategy in response to determining that the RF interference event is persisting.

33. The non-transitory processor-readable storage medium of claim 31, wherein the stored processor-executable software instructions are configured to cause a processor of a wireless device to perform operations such that determining whether the RF interference event is detected comprises:
- monitoring one or more sources of interference;
- calculating a total amount of interference power based on one or more sources of interference;
- determining whether the total amount of interference power exceeds a de-sense threshold; and
- determining that the RF interference event is detected when the total amount of interference power exceeds the de-sense threshold.

34. The non-transitory processor-readable storage medium of claim 31, wherein the stored processor-executable software instructions are configured to cause a processor of a wireless device to perform operations such that creating the RF co-existence management strategy in response to determining that the RF interference event is detected comprises:
- determining whether implementing the robust Rx processing would reduce a downlink channel power or improve throughput; and
- determining to implement the robust Rx processing in response to determining that implementing robust Rx processing would reduce the downlink channel power or improve throughput.

35. The non-transitory processor-readable storage medium of claim 31, wherein the stored processor-executable software instructions are configured to cause a processor of a wireless device to perform operations further comprising performing the following in response to determining that the de-sense is persistent:
- reducing an uplink capacity of the aggressor for every frame; and
- configuring a downlink of the victim to invoke the robust Rx processing during each instance of an uplink transmission of the aggressor that results in a de-sense scenario.

36. The non-transitory processor-readable storage medium of claim 31, wherein the stored processor-executable software instructions are configured to cause a processor of a wireless device to perform operations further comprising performing the following in response to determining that the de-sense is not persistent:
- revoking an uplink slot restriction of the aggressor when the aggressor is currently restricted;
- reducing uplink capacity of the aggressor in each frame affected by RF coexistence; and
- configuring the victim to invoke the robust Rx Processing only during an uplink transmission of the aggressor that result in a de-sense scenario.

37. The non-transitory processor-readable storage medium of claim 31, wherein the stored processor-executable software instructions are configured to cause a processor of a wireless device to perform operations such that implementing the robust Rx processing comprises at least one of:
- implementing a sample nulling strategy;
- freezing loops and filters of the victim; and
- maintaining a power control of the victim.

38. The non-transitory processor-readable storage medium of claim 37, wherein the stored processor-executable software instructions are configured to cause a processor of a wireless device to perform operations further comprising:
- determining a transmission schedule of the aggressor; and
- configuring the victim to receive signals when the aggressor is not transmitting.

39. The non-transitory processor-readable storage medium of claim 37, wherein the stored processor-executable software instructions are configured to cause a processor of a wireless device to perform operations further comprising:
- determining a duration of a robust Rx processing period;
- determining whether the robust Rx processing period has expired; and
- configuring the victim to receive normally when the robust Rx processing period has expired.

40. The non-transitory processor-readable storage medium of claim 37, wherein the stored processor-executable software instructions are configured to cause a processor of a wireless device to perform operations such that freezing loops and filters of the victim comprises freezing one or more of a low-noise amplifier, an automatic gain control, a pilot filter, a received signal strength indication, noise power, a time-tracking loop, a frequency-tracking loop, channel estimation, covariance, and carrier-to-interference estimation.

* * * * *